UNITED STATES PATENT OFFICE 1,944,182

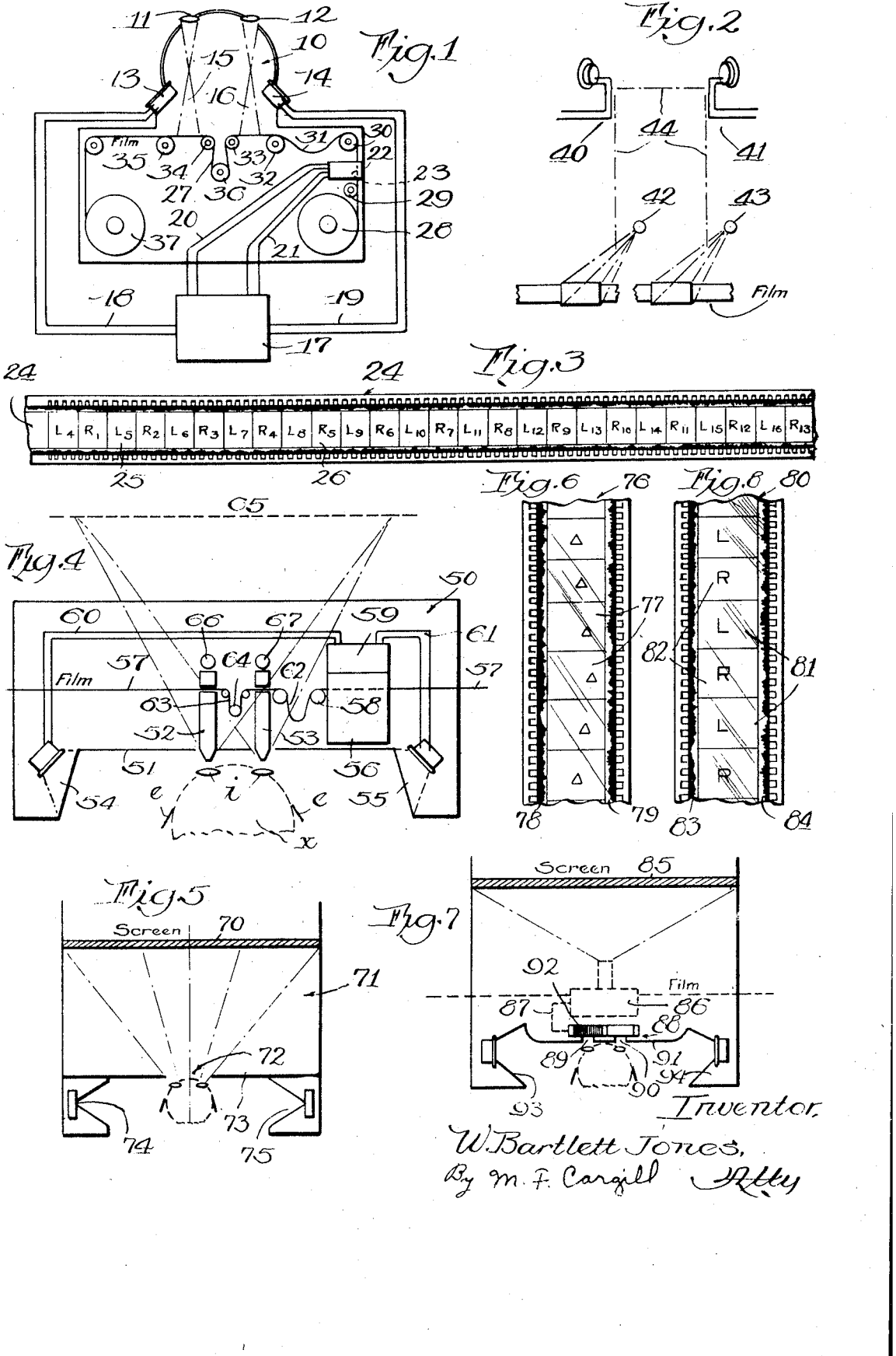

REPRODUCTION OF SPACIALLY COORDINATED SIGHT AND SOUND

W. Bartlett Jones, Chicago, Ill.

Application November 18, 1930
Serial No. 496,434

20 Claims. (Cl. 88—16.2)

The present invention relates to artificial effects simulating natural scenes attended with sounds in a natural relation of sound to the scene. It has particular reference to apparatus, of a cabinet type for example, wherein a scene may be projected and viewed by a person who has a fixed position for the purpose. In this position his head is subjected to the effects of two companion sound waves impinging on the head proper and on the ears to reproduce a natural sensing of sound. The two companion waves should be binaurally related versions of sounds which reproduce directional effects, and by reason of the manner of presenting the binaural versions, there will be virtual origins in space in front of the listener corresponding properly to the scene being presented.

The apparatus may be specially designed for and have a great value as an exhibit in a museum, such as an industrial museum where true reproductions are faithfully to be represented. Such museums have actuated exhibits with dummies involved to present true impressions. These are supplemented by motion picture exhibitions. In all of these "action" is the feature stressed to interest the public. However, "sound" as well as "action" is valuable for this purpose. Unless sound is presented in a natural way considerable of its effectiveness is lost.

One object of the present invention is to present a pictorial scene which is accompanied with natural sounds appearing to the observer from directions truly proper for the picture.

Another object is the presentation of space effects of sight and sound in a natural relation.

A particular object is the presentation of stereoscopic motion pictures accompanied by sound which appears to the observer to arrive from its proper place in the picture in spite of the fact that the picture area is purely visionary.

Various other and ancillary objects and advantages of the invention will be apparent from the following explanation and description of apparatus and methods which are hereinafter disclosed as examples of several ways in which the invention may be carried out in practice.

The presentation of moving pictures in itself involves no difficulties because of the high state of development of that art. In a like manner the synchronism of sound with moving picture records presents no major problems. The presentation of stereoscopic motion pictures has likewise been developed. In the present invention new problems in these arts are created because of the relation of sight and sound for accurate spacial relations on presentation.

The presentation of stereoscopic pictures depends upon photographing left-eye views and right-eye views. In presenting directional effects in sound, there must be records of a right-ear version and of a left-ear version. For recording combined properly related scenic and sound effects according to this invention there must be "artificial eyes" and "artificial ears" having a relation approaching that of normal eyes and ears. Consequently, in the first instance there may be used a dummy head the eyes of which are lenses for picture records, and the ears of which are microphones. These produce two slightly different records each of sight and of sound which can be preserved, reproduced, and presented to real eyes and ears to reproduce the original scene and sound.

The phenomenon of sight is dependent only upon the eyes, the space effects being caused by the difference in angular relations at the two eyes. In hearing the phenomenon is more complex. Sound is sensed and interpreted by reception at three places. Each ear accounts for two of these and the difference in time of arrival at the two ears, or the phasing, is the element by which the senses determine direction only. The third component which is active in ordinary natural hearing is one received by and transmitted by the bones of the head. It is the component which determines the locus of sound in space. If it is received by the rear of the head it indicates a locus behind the head. If it is received by the frontal portions it indicates a locus in front of the head. Take it away, as by the use of head phones and the outside locus disappears. The sound perceived is unnatural and is located inside the head. The present invention permits recreation of natural effects with an outside locus for sound, and presents to the observer the three necessary components. This is accomplished by making two records, one for the right ear and one for the left ear, and presenting them in such a way that the entire head is exposed to both waves. This exposure of the head transmits the sounds to the brain through the ears and through the head bones. It may be accomplished by placing the separated auditor midway between two suitable loud type reproducers which are actuated by the right-ear and left-ear versions. In the art heretofore the term "binaural" has been applied to directional sound effects. The present invention involves the binaural effect but makes use of it in combination with a third component giving loci as well as directions.

The term "binaural" is therefore insufficient in its derived meaning to convey the full meaning of the sound effects involved in this invention.

In the drawing:

Fig. 1 represents diagrammatically in plan view a dummy head having artificial eyes and ears for recording light and sound, in association with apparatus for making records.

Fig. 2 is a diagrammatic representation of a modification in the relation of the camera lenses and the microphones.

Fig. 3 is a representation of the type of film made by the apparatus of Fig. 1.

Fig. 4 shows a presentation cabinet using the type of film of Fig. 3.

Fig. 5 is a plan view of modified type of cabinet in which the picture is a plane projection on a screen.

Fig. 6 is a representation of a suitable film for the apparatus of Fig. 5.

Fig. 7 is a plan view of a second modification of cabinet in which stereoscopic views are made from a film of Fig. 8.

Fig. 8 is a view of a film suitable for stereoscopic effects in the cabinet of Fig. 7.

In Fig. 1 there is shown a device which is in part a dummy head with mechanism for simultaneously making coordinated stereoscopic views and binaural sound records on one film. Of course the invention is not limited to this particular embodiment, nor to joint sound records, nor to the photo-type of sound record. Reference is made to my copending U.S. application Serial No. 311,488, filed October 10, 1928, now U. S. Patent No. 1,855,150, which discloses a cut groove disc record with binaural effects, which record may be synchronized with a film in any known manner. However, I prefer to combine the four records on one film to simplify apparatus and to permit use of one strip of film in several reproducing machines at one time.

A rounded head-like dummy 10 has lenses 11 and 12 for eyes and microphones 13 and 14 for ears. The microphones are preferably mounted in sound insulation (not shown) to prevent sound from the picture mechanism being transmitted thereto. The mechanism may be placed considerably further to the rear of the dummy 10 than has been indicated to minimize the recording of such sounds. A moving picture camera optical system designated 15 and 16 is provided for each lens. Wires 18 and 19 extend from microphones 13 and 14 respectively to electrical recording apparatus for amplification, designated 17, from which electrical connections 20 and 21 lead to suitable electrical means 22 for impressing two photographic sound records on a film 23.

The film is represented in Fig. 3 as a strip containing pictures 24 in horizontal alinement, with sound records as margins 25 and 26. Alternate pictures are left eye records, or right eye records designated R and L. However, the left-eye view L4 which accompanies right-eye view R4 is separated therefrom by several other pictures, namely R1, L5, R2, L6, R3, and L7. The purpose of this arrangement is to provide a slack between the portions which are simultaneously exposed for photographing or projecting. Such slack is designated at 27 in Fig. 1, facilitating an adjustment of the distance between the optical systems, or "eye width".

The film is supplied from a roll 28, and runs through the photo-sound means 22 at a constant speed determined by constant speed feeding rolls 29 and 30. A slack 31 is provided before it enters the jerkily-advancing system for exposure to the scenes viewed from lenses 11 and 12. Suitable feeding mechanism such as controlled rolls 32, 33, 34 and 35 of a known type are provided for advancing and for halting the film momentarily for exposure. The rolls 33 and 34 are employed in conjunction with a roll 36 which may be adjustable to take up the slack 27 of the film. By this arrangement the "eye width" may be adjusted, and the film positioned for proper registry of the pictures as described. The film is rolled up onto a reel 37.

The dummy head relation of the microphones and of the lenses does entail a danger of noise from the nearby mechanism being recorded in the sound film. When the danger is too great and the noise cannot be well isolated by insulation, a departure may be practiced. The microphones and lenses may be vertically separated to an abnormal relation with little change in the coordinated relations. This is due to the fact that angular directions remain substantially the same. The human hearing mechanism is not adapted to distinguish vertical angles at the same time the horizontal directions are distinguished, because the two ears, as phase measuring instruments, are normally horizontally aligned. A true relation will exist between the sight and sound when the horizontal projections of the "eyes" and "ears" is normal. Herein, such a relation is called a "human" relation.

In Fig. 2 a modified arrangement is shown diagrammatically, in which two microphones 40 and 41, still arranged angularly to each other like human ears, are elevated from the normal position relative to the camera eyes 42 and 43. The lines 44 represent structure which tie them together rigidly for pointing the dummy eyes and ears. Apparatus for such a projection will be later described.

Presentation of the effects may be accomplished in several ways. The two views R and L may be flashed in succession on a screen and viewed through an opening for each eye of the observer, with the provision of shutter mechanism, or colored screens in the system to exclude from each eye the view intended for the other eye. Alternatively, both eyes may view separate images at the same time, thus eliminating the necessity of screening one eye from a view for the other eye.

The preferred method of presentation is shown in Fig. 4 which eliminates space required for projection, permitting a shallow cabinet to be placed along the walls of a building such as a museum. Several such cabinets may be placed side by side and the film may travel from one to another, being entirely reproduced in all its features in each cabinet. A shallow cabinet 50 is provided with a front wall 51 into which are set two optical systems 52 and 53 adjustable horizontally to the width of observers eyes. The observer is indicated as X with eyes $i$ and ears $e$. Seeing through the eye pieces positions the observer midway between two loud speakers 54 and 55 which reproduce the two sound records 25 and 26. Pick-up means for the sound is represented by 56 through or past which a positive film 57 passes at constant speed produced in part by a suitable feed roller 58. An amplifying device 59 is shown from which circuits 60 and 61 lead to the loud speakers.

The film 57 has a slack portion 62 therein prior to its entry into the projecting system wherein it is intermittently advanced in the usual fashion. The film has a second slack portion 63 between the two optical systems corresponding to the slack 27 in the negative film of Fig. 1. The adjustment of slack is effected by moving an idler roll 64. The adjustment may be mechanically related to the means for adjustment for "eye width" so that by a simple knob presented to the observer the proper adjustment of the pictures is automatically taken care of.

The film 57 passes into the two optical systems where each view is enlarged and virtually projected as indicated at the illusive area 65. Each eye sees its proper view thus projected and a special effect results. Projection to life-size is the preferred presentation. Light sources 66 and 67 are indicated for illumination.

It is of course not necessary to provide stereoscopic effects. Plane motion pictures may be shown by projecting onto a screen 70 (Fig. 5) in a cabinet 71. A simple opening 72 in the front wall 73 is shown for the observer to look through, using two eyes. This act automatically centers the observer between two loud speakers 74 and 75 which are provided with properly synchronized binaural effects. A suitable film 76 (Fig. 6) is shown in which an ordinary series of pictures 77 is flanked by binaural sound records 78 and 79. Apparatus for such a system as is disclosed in connection with Figs. 5 and 6 differs in no way from present sound picture apparatus, except in the addition of a binaural system of recording and in presenting sound in correlation with the picture.

Stereoscopic effects may also be made using apparatus and film similar to that shown in Figs. 7 and Fig. 8, in which a film 80 has successive left eye views 81 alternately positioned with successive right eye views 82. Sound tracks 83 and 84 are provided at the margins of the film. Such a film may be projected in the usual way on a screen 85 as by apparatus 86 synchronously connected at 87 with a cut-out or shutter device 88. The shutter device is related to eye-openings 89 and 90 in a front wall 91, and alternately opens and closes the passage of vision through said openings to permit each eye to see its proper view. The opening 89 is shown closed by a dark area or shutter 92. At this moment the right eye of an observer may see only a right eye view 82. When the next picture 81 flashes the shutter closure shifts to opening 90, and the left eye sees the picture 81. Two binaural sound presenting reproducers 93 and 94 are associated with apparatus for reproducing the sound records 83 and 84. The eye-openings position an observer so that he is properly disposed between said sound producers to give a true directional effect and a spacial origin to the recorded sounds in proper relation to the screen presentation. The chamber appears alive with action and sound in a natural reproduction.

The use of the invention is in no way limited to museum displays. It may be modified and adapted to home entertainment or to public entertainment. Film may be made and rented, showing a complete opera with sound and sight, and color effects, which in all respects is as real as artificial means can make it. A bank of display cabinets in booths therefor may be arranged for public use, and any of them may be supplied with any chosen film, so that the public at any time may choose its favorite opera or artists and have in effect a private showing for little expense.

Although I have shown the loudspeakers at the extreme right and left of the auditor's station, it is to be understood that this is by no means a limitation. The essential point is that the distances from the loud speakers to the nearest ears are substantially equal. The lines on which said distances are measured limit the directions which can be reproduced to those which fall within the angle between said lines. This is in accordance with the disclosure of my earlier U. S. Patent No. 1,855,146. Where the directions to be reproduced are entirely within the field of the picture screen, the loudspeakers may be moved toward the screen, but should subtend an angle with the auditor which includes said field. An advantage of using the specific relation disclosed is that the range of angles which can be reproduced is the maximum.

It is to be understood that various modifications and changes may be made and that known apparatus may be readily adapted and modified to provide the devices disclosed herein and altered forms thereof, without in any way departing from the spirit and scope of the invention as expressed in the appended claims.

This application is a continuation in part of my copending U. S. application, Serial No. 326,023, filed December 14, 1928, now U. S. Patent No. 1,855,146, and is a continuation in part of my copending application Serial No. 183,414, filed April 13, 1927, now U. S. Patent No. 1,855,149.

I claim:

1. A recording device for making coordinated records of sight and sound which comprises a dummy head portion having camera lenses for eyes and microphones for ears, said parts being arranged to approximate natural relations of human eyes and ears in a human head.

2. A recording device for making coordinated records of sight and sound which comprises a pair of camera lenses arranged for stereoscopic photography, and a pair of binaurally related microphones associated for coordinated motion therewith and vertically removed therefrom when said camera lenses are directed in a horizontal plane.

3. A recording device for making coordinated records of sight and sound which comprises a dummy head portion having a camera system for eyes, and having two microphones positioned in said head relative to said system as human ears are to human eyes.

4. A recording device for making coordinated records of sight and sound which comprises a camera system, and a pair of binaurally related microphones removed from said system in a vertical direction when said camera system is directed in a horizontal plane, the projection of the position of said system and said microphones onto said plane being approximately the same as the plan projection of normal eyes and ears on a similar plane.

5. Apparatus for making coordinated records of sight and sound on a single film which comprises stereoscopic moving picture producing means receiving a strip film upon which the stereoscopic views are photographed, two sound recording binaurally related microphones arranged humanly with respect to the lenses of said means, and means to record the sound picked up by said microphones photographically at two places on said film.

6. Apparatus for making coordinated records of sight and sound on a single film which comprises moving picture producing means, receiving a strip film upon which views are photographed, two sound-recording binaurally related microphones arranged humanly with respect to said moving picture producing means, and means to record the sound picked up by said microphones photographically at two places on said film.

7. In reproducing apparatus for artificial effects involving sight and sound an observing station for a single observer comprising in combination a wall having an opening therein through which a motion picture is observable, said opening predetermining a fixed position of the observers head, two loud speaking units stationed laterally and equidistant from said opening, and means to reproduce through said units two binaurally related sound records.

8. Reproducing apparatus for artificial effects involving sight and sound comprising in combination, stereoscopic moving picture apparatus, a wall having an opening through which one observer may view the picture, said opening predetermining the position of the observer horizontally, and binaural sound reproducing apparatus having two loud type units positioned to be equidistant laterally from the ears of said observer.

9. In combination two loud type sound reproducers spaced apart from each other horizontally a distance permitting the insertion of a human head freely between them, means in the region between said reproducers having a sight opening therein predetermining the position of an observer through said opening as midway between said two reproducers, means presenting a scene visible through said opening, and means to produce binaurally related sounds in said two reproducers.

10. Apparatus for making coordinated records of sight and sound on a single film which comprises moving picture producing means receiving a strip film upon which views are photographed, two sound-recording binaurally related microphones arranged humanly with respect to said moving picture producing means, and means to record the sound picked up by said microphones photographically on said film in a separately reproducible relation.

11. Motion picture film having two versions of the same sounds recorded photographically thereon in a given synchronized relation with the picture record, said versions corresponding to the right-ear and left-ear versions of the same sounds as would appear to a human head positioned at the location of the camera producing the picture record.

12. Motion picture film having pictures thereon alined horizontally and two sound records on said film related to said picture record, said sound records corresponding to right-ear and left-ear versions of sounds appropriated from the original scene of the picture as the same are phased at two points located in the same relation as ears on a human head positioned at the location of the camera producing the picture record.

13. In combination, a motion picture film and two sound records which correspond to the right-ear and left-ear versions of sound intercepted for record from the sources in the original scene of the picture at points separated like the ears on a human head positioned at the location of the camera producing the picture record.

14. In combination a series of stereoscopically related pictures for motion picture presentation, and two sound records which correspond to the right-ear and left-ear versions of sound intercepted for record from the sources in the original scene of the picture at points separated like the ears on a human head positioned at the location of the camera producing the picture record.

15. Reproducing apparatus for artificial effects involving sight and sound, comprising in combination, means to project a photographed image to a substantially life-sized projection, a station for an auditor-observer to view the picture in substantially normal full view without angular distortion, and means to provide to the auditor in said station at his right ear a right-ear version, and at his left ear a left-ear version, of two reproduced sound records having said versions corresponding to the right-ear and left-ear versions of sounds originating in the original field of the picture as would appear to a human head positioned at the location of the camera producing the picture, said means being incapable of distorting the phasing of the versions as so intercepted for recording.

16. Reproducing apparatus for artificial effects involving sight and sound comprising in combination, stereoscopic moving picture apparatus, picture records of left-eye and right-eye views therefor, sound reproducing apparatus, records of right-ear and left-ear versions of sound from the same source as the picture records and from the same pick-up location, and means to synchronize the reproduction of the picture and sound, the sound reproducing apparatus being adapted for reproduction and presentation to an auditor without change of phasing of said two versions of sound.

17. Apparatus comprising in combination means providing a sight hole for each eye, means for presenting through said holes to the right eye a right-eye view, and to the left eye a left-eye view of the same scene, the respective views being in kinetoscopic succession to produce moving right-eye effects and moving left-eye effects, two sound records of sound fitting the picture corresponding to the right-ear and the left-ear versions of the said sounds as would appear to a human head positioned at the location of the camera producing the picture records, and means synchronized with the picture producing means for reproducing sounds from the sound records and for presenting them respectively without phase distortion to the right and left ears of a human head looking into said sight holes.

18. Apparatus comprising in combination means providing a sight opening for each eye, means providing an area for registration of left-eye and right-eye views of the same scene, means for alternately presenting left-eye and right-eye views at said area, the left eye views as a group, and the right eye views as a group being presented in kinetoscopic relation, means operating alternately at the sight openings for cutting off the right-eye view from vision by the left-eye, and the left-eye view from vision by the right eye, two sound records of sound fitting the picture corresponding to the right-ear and the left-ear versions of the said sounds as would appear to a human head positioned at the location of the camera producing the picture records, and means synchronized with the picture producing means for reproducing sounds from the sound records and for presenting them respectively without phase distortion to the right and left ears of a human head looking into said sight holes.

19. In combination apparatus for producing a motion picture to be viewed by a human being in a fixed relation to the picture, a record of the scene to be reproduced by said apparatus, sound reproducing apparatus synchronized with the motion picture apparatus, and two sound records of sounds fitting the picture, said records corresponding to the right-ear and left-ear versions of the said sounds as would appear to a human head positioned at the location of the camera producing the picture record, and said sound reproducing apparatus being adapted to present the said versions respectively to the right and left ears of an observer of the picture without disturbing the recorded phase relation.

20. In combination, means providing an observation station for sight and sound, means for presenting for view from said station a motion picture, a picture record for said apparatus, sound producing apparatus, two sound records of sounds appropriate for the picture corresponding to the right-ear and left-ear versions of the same sounds as would appear to a human head positioned at the point of view of said picture in the making thereof, and means to synchronize said apparatus for simultaneous operation, said sound reproducing apparatus being adapted as by its relation to said station, to preserve for audition the recorded phase relation of said two versions.

W. BARTLETT JONES.